United States Patent
Joshi et al.

(10) Patent No.: US 7,299,407 B2
(45) Date of Patent: Nov. 20, 2007

(54) MARKING AND ANNOTATING ELECTRONIC DOCUMENTS

(75) Inventors: Mukul Madhular Joshi, Pune (IN); Mukesh Kumar Mohania, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 10/924,447

(22) Filed: Aug. 24, 2004

(65) Prior Publication Data

US 2006/0048046 A1  Mar. 2, 2006

(51) Int. Cl.
*G06F 17/21* (2006.01)
*G06F 17/24* (2006.01)

(52) U.S. Cl. ............... 715/512; 715/500; 715/511; 715/537

(58) Field of Classification Search ......... 715/500, 715/511, 512, 537
See application file for complete search history.

(56) References Cited

U.S. PATENT DOCUMENTS

| | | | |
|---|---|---|---|
| 6,269,189 B1 * | 7/2001 | Chanod | 382/229 |
| 6,551,357 B1 * | 4/2003 | Madduri | 715/512 |
| 6,571,295 B1 * | 5/2003 | Sidana | 709/246 |
| 6,728,760 B1 * | 4/2004 | Fairchild et al. | 709/217 |
| 6,928,425 B2 * | 8/2005 | Grefenstette et al. | 707/2 |
| 2004/0034832 A1 * | 2/2004 | Taylor et al. | 715/512 |
| 2004/0078757 A1 * | 4/2004 | Golovchinsky et al. | 715/512 |
| 2005/0160355 A1 * | 7/2005 | Cragun et al. | 715/512 |

OTHER PUBLICATIONS

Kahan et al., "Annotea: An Open RDF Infrastructure for Shared Web Annotations". 2001, ACM, pp. 623-632.*
Microsoft Corporation, Microsoft Help files on "History" for Internet Explorer version 6.0, published in 2001.*

* cited by examiner

*Primary Examiner*—Stephen Hong
*Assistant Examiner*—Joshua D Campbell
(74) *Attorney, Agent, or Firm*—Gibb & Rahman, LLC

(57) ABSTRACT

A user can highlight text and provide accompanying annotations. Highlighted text, accompanying annotations, and time-stamp information are stored in a user profile that is maintained locally with a web browser, at the client side. A retrieved web page is presented to a user with annotations of some form, based upon the user profile. The retrieved web page may typically be annotated through marked or highlighted portions of text, so that the user can readily locate this information in the web page, and assess the relevance of the retrieved page.

3 Claims, 6 Drawing Sheets

```
1   <script>
2     // Text Extractor and Annotator Simulation
3   bBool=false
4   var copiedtext=""
5   var tempstore=""
6   var date=Date();
7   function initiatecopy() {
8   bBool=true;
9   }
10  function copyit() {
11  if (bBool) {
12  tempstore=copiedtext
13  document.execCommand("Copy")
14  copiedtext=window.clipboardData.getData("Text");
15  if (tempstore!=copiedtext) {
16  annotation=prompt("Enter annotation for " + copiedtext,"");
17  }
18  bBool=false;
19  }
20  // Profile Manager Simulation
22  var fso, ts;
23  var ForWriting=8;
24  fso = new ActiveXObject("Scripting.FileSystemObject");
25  ts = fso.OpenTextFile("c:\\Documents and
27    Settings\\xyz\\profile.txt", ForWriting, true);
28  ts.WriteLine(annotation+"|"+copiedtext+"|"+date)  ;
29  ts.Close();
30  }
31  // Event Listener Simulation
32  document.onselectionchange = initiatecopy
33  document.onmouseup = copyit
34  </script>
```

FIG. 4

MARKING AND ANNOTATING ELECTRONIC DOCUMENTS

FIELD OF THE INVENTION

The present invention relates to marking and annotating electronic documents, such as Web pages, based on a user's highlighted preferences history.

BACKGROUND

Web personalization involves tailoring Web content directly to a specific user. This can be accomplished by having the user provide information to the Web site directly, or through tracking of the user's behavior on the site. The software on the Web site then can modify the content to suit the particular user's needs. That is, all the personalization is done at the Web site.

Typically, a Web site maintains profiles of the users that visits the site, and analyzes the information gathered. Based on this analysis, information of interest to each user is delivered.

Explicit or implicit profiling techniques can be used to collect user information, either alone or in combination. Explicit profiling involves asking each user to complete a questionnaire or similar, while implicit profiling involves tracking the behavior of each user, and drawing inferences from such observed behavior.

One form of implicit profiling involves the use of "cookies" that are stored at the browser and updated at each visit, and record browsing patterns.

To present appropriate content to the user and make proper recommendation, rule-based techniques or filtering techniques can be used. Filtering techniques may involve simple filtering, content-based filtering and collaborative filtering. Collaborative-filtering software compares the information gained about one user's behavior against data about other users with similar interests.

None of the techniques described above are entirely satisfactory. Consequently, techniques are sought that have application in navigating electronic content.

SUMMARY

A user's interest in a recently viewed web page can be determined automatically from that user's highlighted text and annotation history profiled from the previously viewed web pages. Such annotations typically constitute marked or highlighted portions of text, accompanying comments, or other forms of annotation. This annotation information is maintained in a user profile at the client side. A retrieved web page is presented to a user with annotations of some form, based upon the viewer's user profile. The retrieved web page may typically be annotated through marked or highlighted portions of text, so that the user can readily locate this information in the web page, and assess the relevance of the retrieved page.

A context for the highlighted information is obtained by annotating the text, and can be presented to the user along with the text. A web page presented to the user is marked to indicate the information of interest. When a user rolls the mouse over this text, the annotation is shown at the mouse position. This is the context that applies to the text, which indicates to the user the broad topic to which the marked text relates. Ontology can be represented in any form, and can be stored as a database, and represents relationships between words. A word-net can be used to enhance this gathered information. Information concerning the user's interest can be presented to the user without the need for server-side processing.

Highlighted text, accompanying comments, and timestamp information are stored in a user profile that is maintained locally with the browser, at the client side. The user profile is updated as the user visits new pages and annotates these web pages. When a user accesses a new web page, text in this page that is, for example, similar to the text stored in the user profile, is automatically marked. Other annotations can also be assigned. Since the marking occurs at the client side, profiles can be shared and used across different sites the user visits.

DESCRIPTION OF DRAWINGS

FIG. 4 is Javascript code that can be added to a Web page to faciliate annotation of the highlighted text on the Web page.

DETAILED DESCRIPTION

Figure 1:
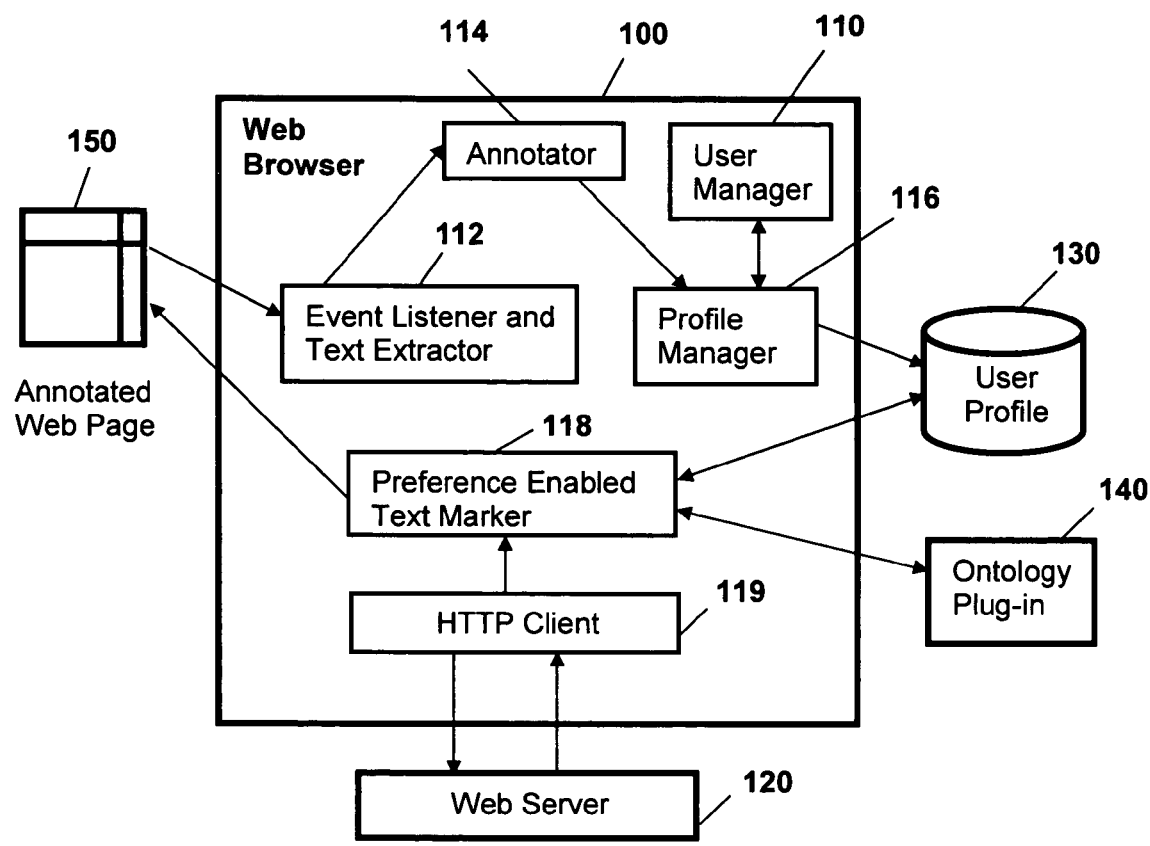
FIG. 1 is a schematic representation of a system architecture for annotating electronic documents.

FIG. 1 schematically represents an architecture of the described system. A Web Browser 100 is enabled to create and update a User Profile 130 based on highlighted and annotated text of previous web pages. The Web Browser 100 then marks the text in the retrieved Web Page 150 based on the User Profile 130. The marked Web Page 150 is presented to the user by the Web Browser 100.

Figure 2:
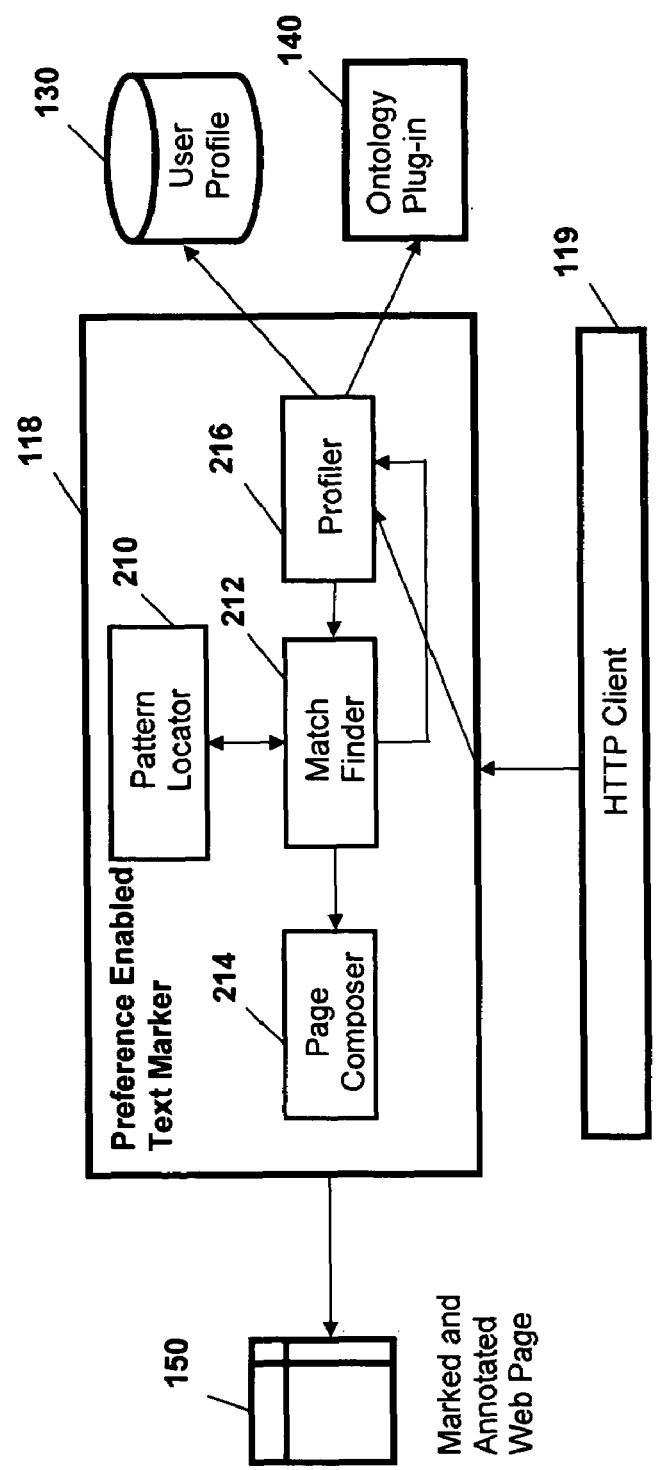
FIG. 2 is a schematic representation of components of a preference-enable text marker.

The system architecture of FIG. 1 has five components that supplement the Web Browser 100, namely, User Manager 110, Event Listener and Text Extractor 112, Annotator 114, Profile Manager 116 and Preference Enabled Text Marker 118 that supplement the functionality of a conventional web browser. Each of these components is described in turn below. FIG. 2 schematically represents components of the Preference Enabled Text Marker 118, described in further detail below.

User Manager: The main function of the User Manager 110 is to identify the "userid" of the "logged on" user. The User Manager 110 also creates a User Profile 130, if a User Profile 130 does not already exist. Each user has their own User Profile 130 that stores their preferences. The User Manager 110 maintains the privacy of each user. The security and privacy of the User Profile 130 can be maintained using the file system user privileges provided by the operating system. If the operating system does not provide a way to identify the user, then the system can maintain a single User Profile 130 that is common to all the users of that particular instance of the Web Browser 100.

Event Listener and Text Extractor: The Event Listener and Text Extractor 112 listens to the "mouse-dragged" event. This operating system event gets fired whenever a user highlights particular text in a web page. When the event is fired the Event Listener and Text Extractor 112 extracts the highlighted text from the web page and sends the text string to the Annotator 114, which is described directly below.

Annotator: The Annotator 114 enables the user to annotate the user's highlighted text. This allows the user to associate the context with the highlighted text. When the user annotates a text, the user's annotating comments may either summarize the text or disambiguate the text. This is what meant by giving a context to the text of interest to the user. For example, a particular text about networking might be of interest to one user because the text is about wireless networking, for another user the text may be interesting since the text is about security. So when the user annotates the text with words "network security", this is the context in which the user looking for further information. Therefore, a particular text might be relevant within different contexts, i.e., the text can have different meanings depending upon how the text is used. Thus, annotation helps the system to distinguish between different possible meanings of the text. The second use of annotation is to summarize a text. For example, the user visits page "A" and highlights the text "optimized to manage large collections of smaller objects such as statements and reports and checks" appearing on page "A". The system does not in his case receive any information concerning what the information is about. Annotator 114, however, allow the user to mark this information with the annotation of "content manager". Now the system can make use of the annotation to find the information of the user interest in the pages that talk about "content manager". Once the highlighted text is annotated, if any, then the Annotator 114 passes the highlighted text along with accompanying annotation to the Profile Manager 116.

Profile Manager: Profile Manager 116 receives the annotated highlighted text from the Annotator 114. Profile Manager 116 obtains the file system location of the User Profile 130 from the User Manager 110. Profile Manager 116 then stores this highlighted text along with the associated annotation in the User Profile 130. Table 1 below presents the format of the User Profile 130.

TABLE 1

Format of User Profile 130

| Highlighted Text | \Annotation | Timestamp of highlighting | Timestamp of Expiry |
|---|---|---|---|
| .................. | .................. | .................. | |
| .................. | .................. | .................. | |
| .................. | .................. | .................. | |

As shown in Table 1 above, the User Profile 130 stores the time when the user highlighted and annotated the relevant text. The fourth row indicates the "life" of each entry in the User Profile 130 (that is, each highlighted text and its annotation). An "Expiry date" can be used to avoid maintaining the history beyond certain time.

The user can set a system parameter that controls how much past history is considered when marking a Web Page 150. The Profile Manager 116 uses this parameter to compute the Timestamp of Expiry for the User Profile 130 entry. Suppose the user sets the parameters to indicate that the user is interested in keeping the history for 30 days. If an entry is made in the user profile, for page A on 1 Jan. 12 p.m. 30 days time is added to the time when the entry is inserted. This is the time of expiry. Time of expiry is 31 Jan. 12.00 pm. Now, on 10 Jan. the user again changes the parameter to contain 20 days of history. The time of expiry for page A is updated by adding 20 days to timestamp of highlighting. Alternatively, after highlighting and annotating the user can be prompted to provide the time duration for which the information is to persist in the User Profile 130. The expiry time for the information is then calculated and stored in the User Profile 130 along with the other information. Profile Manager 116 runs a maintenance algorithm that removes entries in the User Profile 130 that are expired.

Preference-Enabled Text Marker: The Preference Enabled Text Marker 118 receives web pages from the HTTP client 119 in the Web Browser 100, which in turn retrieves web pages from the Web Server 120. The Preference Enabled Text Marker 118 presents web pages to the user in such a way that the information is highlighted and annotated automatically. This highlighting and annotation is based upon the User Profile 130, which contains the history of the highlighted text and annotations from the previously browsed pages. FIG. 2 schematically represents different components of the Preference Enabled Text Marker 118.

Various steps performed by the Preference Enabled Text Marker 118 are now described with reference to the components of the Preference Enabled Text Marker 118 depicted in FIG. 2. Let LA be a list of all annotations (List of Annotations) in the User Profile 130, let $T_i$ be the list of all highlighted text available in the user profile for annotation $\alpha_i$, and let $S_i$ be the list of synonyms of annotation $\alpha_i$. Table 2 below presents an algorithm performed by the Preference Enabled Text Marker 118.

TABLE 2

1. A page W retrieved by the HTTP client 119 from the Web Server 120 is provided to the Profiler 216.
2. The Profiler 216 then reads the User Profile 130 of that user and retrieves LA
3. For each annotation $a_i$ in the list LA
   a. Profiler 216 retrieves a list of all the corresponding highlighted text entries $T_i$.
   b. Profiler 216 queries an Ontology Plug-in 140 to get $S_i$.
   c. Profiler 216 passes $S_i$, $T_i$, $a_i$ and W to the Match Finder 212.
   d. Match Finder 212 passes $T_i$ and W to Pattern Locator 210.
   e. Pattern Locator 210 finds the position of each text element of $T_i$ in W, and returns back a list denoted by $P_i$ of position pairs $<b_i, e_i>$ providing beginning and ending positions of the sentence in the retrieved web page in which the strings were approximately matched.
   f. Match Finder 212 stores this list $P_i$ and then passes $S_i$, $a_i$ and W to the Pattern Locator 210.
   g. Pattern Locator 210 performs exact string matching for each of TABLE 2-continued the string in $S_i$ and $a_i$ in W. Pattern Locator 210 returns back a list denoted $P_j$ of position pairs $<b_i, e_i>$ of the beginning and ending positions of the sentence in the retrieved web page in which the strings were exactly matched.

h. Match Finder 212 now merges $P_i$ and $P_j$ and removes duplicates, if there are any. For each entry $<b_i, e_i>$ in this merged list, Match Finder 212 augments the annotation $a_i$ and stores the resulting triplet $<b_i, e_i, a_i>$ in pattern list LP.

i. Match Finder 212 sends a signal to Profiler 216 that Match Finder 212 has updated the pattern list for annotation $a_i$.

4. Profiler 216 sends a signal to Match Finder 212 that all the annotations have been processed and sends it W and LA.

5. Match Finder 212 then sends W, LA and pattern list LP to the Page Composer 214.

6. Page Composer 214 performs the following steps
   a. For each $a_i$ in LA. Page Composer 214 assigns a unique combination of foreground and background colors.
   b. For each triplet $<b_i, e_i, a_i>$ in LP, the Page Composer 214 obtains the starting position $b_i$ and ending position $e_i$ of the sentence in the Web page and then inserts Hypertext Markup Language (HTML) tags at the starting and ending position so that the text of the sentence appears in bold with the foreground and background colors corresponding to $a_i$. This operation performs the marking for the text matching with the user's preferences. Also Page Composer 214 inserts a special tag so that the annotation $a_i$ is shown as a "tip" when user rolls the mouse over the sentence text.

7. The Page Composer 214 then presents this modified page to the user.

The Pattern Locator 210 used by the Preference Enabled Text Marker 118 uses a module to perform approximate string matching in step 3e of Table 2, using any suitable approximate string matching algorithm. A suitable algorithm is described in Cole, R., Hariharan, R., "Approximate String Matching: A simpler faster algorithm", *SIAM Journal on Computing*, Volume 31, Number 6, pages 1761-1782, 2002, the content of which is hereby incorporated by reference.

Figure 3:
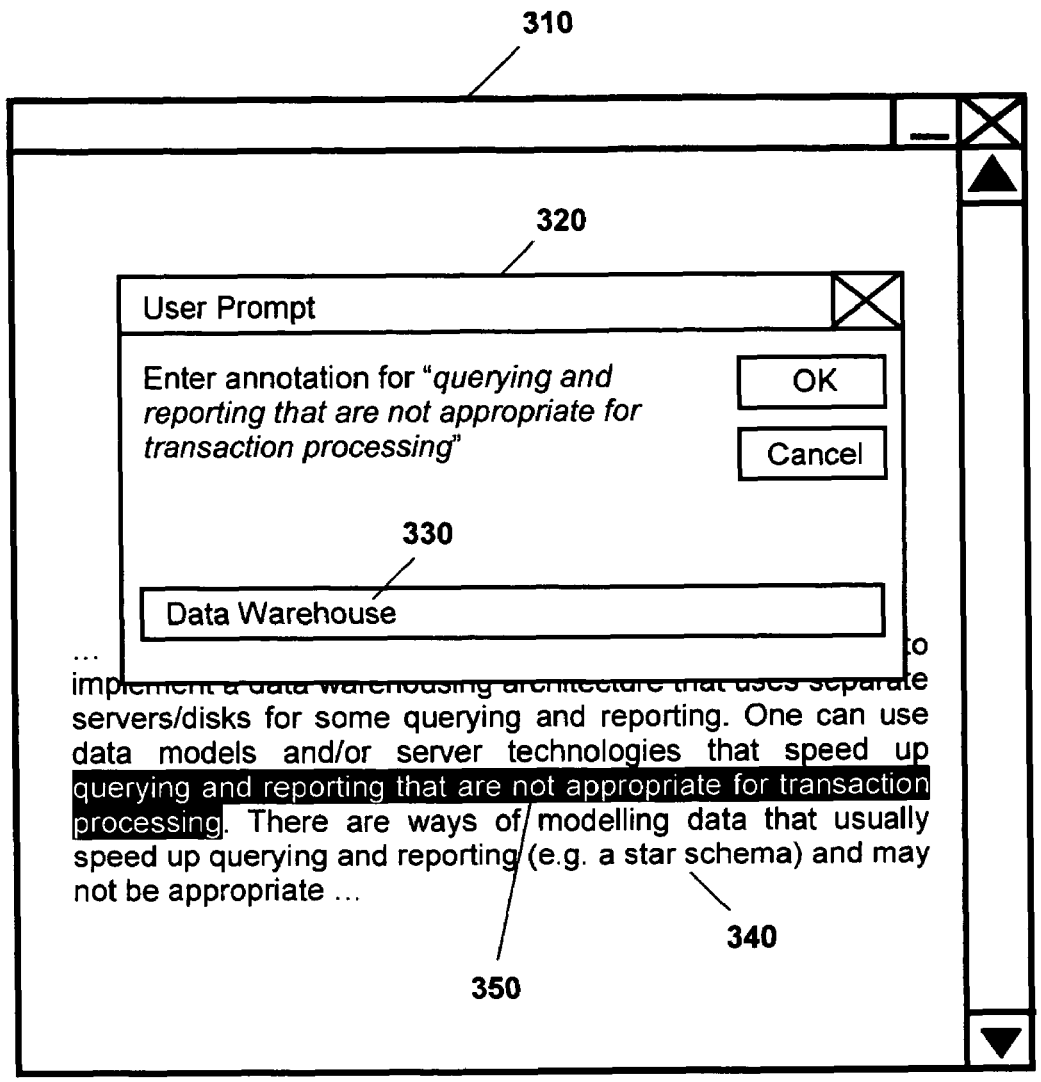
FIG. 3 is a schematic representation of a computer interface having a dialog box for prompting a user to annotate text.

FIG. 3 schematically represents a typical user experience while using the system. A user interface window 310 displays text 340. When a user highlights a portion of text 350, Event Listener and Text Extractor 112 is activated and extracts the highlighted text, which is passed to the Annotator 114. Annotator 114 then prompts the user to provide an accompanying comment 330 for the highlighted text 350 using a dialog box 320.

Web Browser Implementations

A web browser having the functionality described herein can be constructed by adding appropriate components to a conventional browser. The browser needs to read the User Profile 130, which is created by the user. The user appropriately creates the User Profile 130 in the right (system) directory structure with the right schema so that the browser can read the User Profile 130, and take appropriate action in marking and annotating documents automatically.

Alternatively, an implementation can be achieved without adding components to a Web browser, but by achieving equivalent functionality using code embedded in the actual Web pages. FIG. 4 presents Javascript code, which is interpreted by compatible browsers, and which can be used for this purpose.

The web page is downloaded, and the User Manager 110 is invoked to identify the user and the appropriate user profile location. Javascript code can be added to the web page to provide the simulation for the Event Listener and Text Extractor 112, Annotator 114 and Profile Manager 116. The "Preference Enabled Text Marker" algorithm described above is then applied to the page, and the page is presented to the user through a web browser.

A maintenance algorithm, which removes entries in the User Profile 130, is activated by the Profile Manager 116 and runs as a daemon in the background. To understand the working of the simulator, assume that the user "xyz" starts using the simulated system for the first time. The User Manager 110 identifies the user and creates the User Profile 130. Initially, the User Profile 130 is empty. If the user wants to browse the page www.abc.com the browser downloads the relevant page. The Javascript code of FIG. 4 is added to the downloaded page, either by including appropriate Javascript to the downloaded web page, or by using a suitable browser plugin for the browser.

Since the user is using the system for the first time, the code for the "Preference Enabled Text Marker" presents the page to the user without alteration. When the user highlights and annotates information in this presented page, these annotations are stored in the User Profile 130. When the user sends a request to the simulator to browse another page, the same steps as mentioned above are carried out for this requested page. When the page is passed to Preference Enabled Text Marker 118, this page is passed to its various components and the simulator presents the final composed page to the user.

Annotations to Browsed Documents

Figure 5:
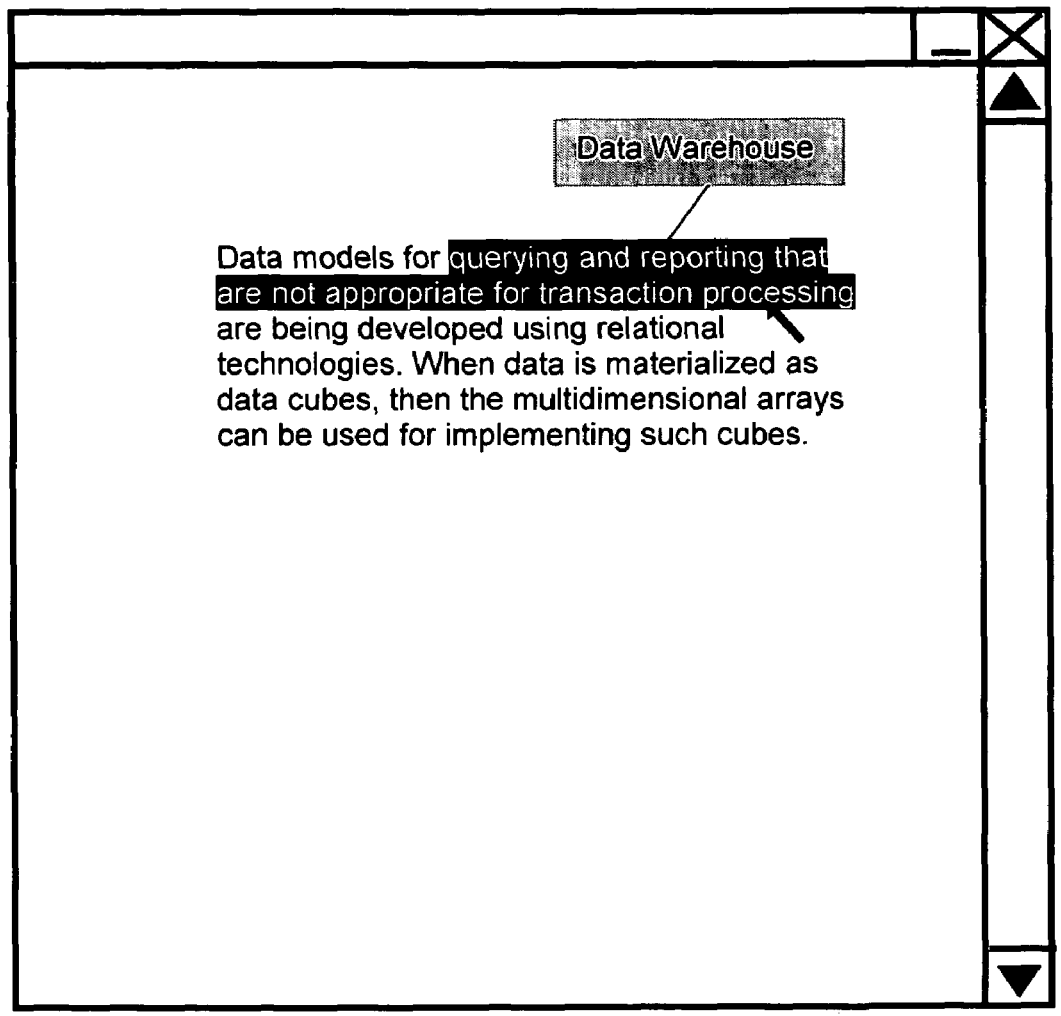
FIG. 5 is a schematic representation of a computer interface indicating information of interest to a user.

FIG. 5 represents a page in which annotations are made based upon a user profile. In this example, when the user brings the mouse on top of the first line of text, a entry "Data Warehouse" is displayed as the highlighted line is annotated by "Data Warehouse" in FIG. 3, as recorded in the User Profile 130. In FIG. 3, the user annotates this same text, which is associated with this annotation in the User Profile 130. When a new page is fetched, the User Profile 130 is automatically applied on the fetched page and the text is automatically highlighted and annotated.

Computer Hardware

Figure 6:
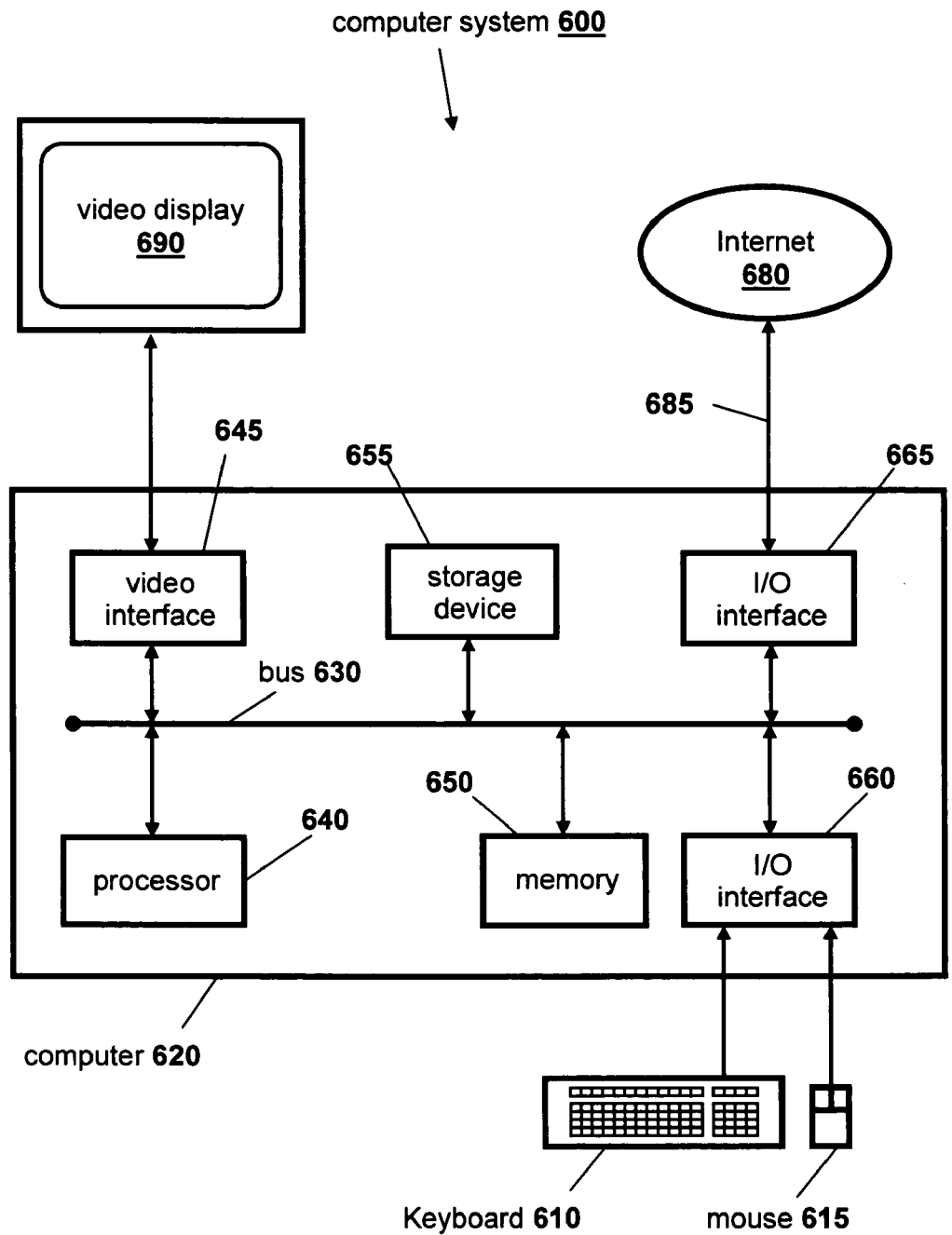
FIG. 6 is a schematic representation of a computer system suitable for operating the described computer interfaces.

FIG. 6 is a schematic representation of a computer system 600 of a type that is suitable for executing computer software for annotating electronic documents in the manner described herein. Computer software executes under a suitable operating system installed on the computer system 600, and may be thought of as comprising various software code means for achieving particular steps.

The components of the computer system 600 include a computer 620, a keyboard 610 and mouse 615, and a video display 690. The computer 620 includes a processor 640, a memory 650, input/output (I/O) interfaces 660, 665, a video interface 645, and a storage device 655.

The processor 640 is a central processing unit (CPU) that executes the operating system and the computer software executing under the operating system. The memory 650 includes random access memory (RAM) and read-only memory (ROM), and is used under direction of the processor 640.

The video interface 645 is connected to video display 690 and provides video signals for display on the video display 690. User input to operate the computer 620 is provided from the keyboard 610 and mouse 615. The storage device 655 can include a disk drive or any other suitable storage medium.

Each of the components of the computer 620 is connected to an internal bus 630 that includes data, address, and control buses, to allow components of the computer 620 to communicate with each other via the bus 630.

The computer system 600 can be connected to one or more other similar computers via a input/output (I/O) interface 665 using a communication channel 685 to a network, represented as the Internet 680.

The computer software may be recorded on a portable storage medium, in which case, the computer software program is accessed by the computer system 600 from the storage device 655. Alternatively, the computer software can be accessed directly from the Internet 680 by the computer 620. In either case, a user can interact with the computer system 600 using the keyboard 610 and mouse 615 to operate the programmed computer software executing on the computer 620.

Other configurations or types of computer systems can be equally well used to execute computer software that assists in implementing the techniques described herein.

Various alterations and modifications can be made to the techniques and arrangements described herein, as would be apparent to one skilled in the relevant art.

We claim:

1. A method for marking and annotating an electronic document, said method comprising:
    at a client side, a user highlighting text in a web page, and providing comments accompanying the highlighted text in order to provide a user context of said highlighted text, relating to user interests in a first electronic document;
    a text extractor extracting the highlighted text from said web page and creating text strings associated with said highlighted text;
    said text extractor sending said text string to an annotator;
    said user using said annotator to annotate said text relating to said user interests, wherein said annotating comprises using said user context of said highlighted text to distinguish between different possible meanings of said highlighted text;
    storing the annotations, the highlighted text, and the accompanying comments at said client side as a user profile based upon said annotations;
    retrieving said web page by a hypertext transfer protocol (HTTP) client via a web server;
    providing said web page to a profiler;
    said profiler reading said user profiler established for a particular user;
    said profiler retrieving a list of all annotations in said user profiler;
    for each annotation in said list, said profiler:
        retrieving a list of all corresponding highlighted text; and
        querying an ontology plug-in component to retrieve a list of all synonyms for said each annotation;
    said profiler passing said list of all synonyms, said list of all corresponding highlighted text, said each annotation, and said web page to a match finder;
    said match finder passing said list of all corresponding highlighted text and said web page to a pattern locator;
    said pattern locator finding a position of each text element of said list of all corresponding highlighted text in said web page;
    said pattern locator returning back a first list of position pairs providing beginning and ending positions of a sentence in the retrieved web page in which said text strings were approximately matched;
    said match finder storing said first list of position pairs;
    said match finder passing said list of all synonyms, said each annotation, and said web page to said pattern locator;
    said pattern locator performing an exact string matching process for each of the strings in all synonyms and said each annotation in said web page;
    said pattern locator returning back a second list of position pairs providing beginning and ending positions of a sentence in said retrieved web page in which said text strings were exactly matched;
    said match finder merging said first list of position pairs and said second list of position pairs and removing duplicate entries in the merged list;
    for each entry in said merged list, said match finder augmenting said each annotation and storing a resulting triplet in a pattern list;
    said match finder sending a signal to said profiler that said match finder has updated said pattern list for said each annotation;
    said profiler sending a signal to said match finder that all annotations have been processed;
    said profiler sending said match finder said web page and said list of all annotations;
    said match finder sending said web page, said list of all annotations, and said pattern list to a page composer; and
    said page composer performing:
        for each annotation in said list of all annotations, assigning a unique combination of foreground and background colors;
        for each said triplet in said pattern list, obtaining a starting position and ending position of the sentence in said web page and then inserting Hypertext Markup Language (HTML) tags at the starting and ending positions so that the text of said sentence appears in bold with said foreground and background colors corresponding to said annotation;
        inserting a tag so that said annotation is shown as a tip when a user rolls a mouse over the sentence text; and
        presenting a modified web page to said user.

2. A computer program product for annotating an electronic document comprising computer software recorded on a computer-readable medium for performing a method for marking and annotating an electronic document, said method composing:

at a client side, a user highlighting text in a web page, and
providing comments accompanying the highlighted
text in order to provide a user context of said highlighted text, relating to user interests in a first electronic
document;
a text extractor extracting the highlighted text from said
web page and creating text strings associated with said
highlighted text;
said text extractor sending said text string to an annotator;
said user using said annotator to annotate said text relating
to said user interests, wherein said annotating comprises using said user context of said highlighted text to
distinguish between different possible meanings of said
highlighted text;
storing the annotations, the highlighted text, and the
accompanying comments at said client side as a user
profile based upon said annotations;
retrieving said web page by a hypertext transfer protocol
(HTTP) client via a web server;
providing said web page to a profiler;
said profiler reading said user profiler established for a
particular user;
said profiler retrieving a list of all annotations in said user
profiler;
for each annotation in said list, said profiler:
 retrieving a list of all corresponding highlighted text;
 and
 querying an ontology plug-in component to retrieve a
  list of all synonyms for said each annotation;
said profiler passing said list of all synonyms, said list of
all corresponding highlighted text, said each annotation, and said web page to a match finder;
said match finder passing said list of all corresponding
highlighted text and said web page to a pattern locator;
said pattern locator finding a position of each text element
of said list of all corresponding highlighted text in said
web page;
said pattern locator returning back a first list of position
pairs providing beginning and ending positions of a
sentence in the retrieved web page in which said text
strings were approximately matched;
said match finder storing said first list of position pairs;
said match finder passing said list of all synonyms, said
each annotation, and said web page to said pattern
locator;
said pattern locator performing an exact string matching
process for each of the strings in all synonyms and said
each annotation in said web page;
said pattern locator returning back a second list of position pairs providing beginning and ending positions of
a sentence in said retrieved web page in which said text
strings were exactly matched;
said match finder merging said first list of position pairs
and said second list of position pairs and removing
duplicate entries in the merged list;
for each entry in said merged list, said match finder
augmenting said each annotation and storing a resulting
triplet in a pattern list;
said match finder sending a signal to said profiler that said
match finder has updated said pattern list for said each
annotation;
said profiler sending a signal to said match finder that all
annotations have been processed;
said profiler sending said match finder said web page and
said list of all annotations;

said match finder sending said web page, said list of all
annotations, and said pattern list to a page composer;
and
said page composer performing:
 for each annotation in said list of all annotations,
  assigning a unique combination of foreground and
  background colors;
 for each said triplet in said pattern list, obtaining a
  starting position and ending position of the sentence
  in said web page and then inserting Hypertext
  Markup Language (HTML) tags at the starting and
  ending positions so that the text of said sentence
  appears in bold with said foreground and background
  colors corresponding to said annotation;
 inserting a tag so that said annotation is shown as a tip
  when a user rolls a mouse over the sentence text; and
 presenting a modified web page to said user.
3. A computer system for annotating electronic documents
comprising computer software recorded on a computer-readable medium, said computer system comprising:
a client side comprising a user highlighting text in a web
page and providing comments accompanying the highlighted text in order to provide a user context of said
highlighted text, relating to user interests in a first
electronic document;
a text extractor extracting the highlighted text from said
web page and creating text strings associated with said
highlighted text;
said text extractor sending said text string to an annotator;
said user using said annotator to annotate said text relating
to said user interests, wherein said annotating comprises using said user context of said highlighted text to
distinguish between different possible meanings of said
highlighted text;
a user profile adapted to store the annotations, the highlighted text, and the accompanying comments based
upon said annotations;
a hypertext transfer protocol (HTTP) client adapted to
retrieve said web page by via a web server;
a profiler adapted to receive said web page, wherein said
profiler is adapted to:
 read said user profiler established for a particular user;
 retrieve a list of all annotations in said user profiler;
 for each annotation in said list, said profiler further
  adapted to:
   retrieve a list of all corresponding highlighted text;
   and
   query an ontology plug-in component to retrieve a
    list of all synonyms for said each annotation;
 pass said list of all synonyms, said list of all corresponding highlighted text, said each annotation, and
  said web page to a match finder;
wherein said match finder is adapted to pass said list of all
corresponding highlighted text and said web page to a
pattern locator;
wherein said pattern locator is adapted to:
 find a position of each text element of said list of all
  corresponding highlighted text in said web page; and
 return back a first list of position pairs providing
  beginning and ending positions of a sentence in the
  retrieved web page in which said text strings were
  approximately matched;
wherein said match finder is adapted to store said first list
of position pairs;
said match finder passing said list of all synonyms, said
each annotation, and said web page to said pattern
locator;

wherein said pattern locator is further adapted to:
    perform an exact string matching process for each of the strings in all synonyms and said each annotation in said web page;
    return back a second list of position pairs providing beginning and ending positions of a sentence in said retrieved web page in which said text strings were exactly matched;
wherein said match finder is further adapted to:
    merge said first list of position pairs and said second list of position pairs and removing duplicate entries in the merged list;
    for each entry in said merged list, augment said each annotation and storing a resulting triplet in a pattern list;
    send a signal to said profiler that said match finder has updated said pattern list for said each annotation;
wherein said profiler is further adapted to:
    send a signal to said match finder that all annotations have been processed;
    send said match finder said web page and said list of all annotations;
wherein said match finder is further adapted to send said web page, said list of all annotations, and said pattern list to a page composer;
wherein said page composer is adapted to:
    for each annotation in said list of all annotations, assign a unique combination of foreground and background colors;
    for each said triplet in said pattern list, obtain a starting position and ending position of the sentence in said web page and then inserting Hypertext Markup Language (HTML) tags at the starting and ending positions so that the text of said sentence appears in bold with said foreground and background colors corresponding to said annotation;
    insert a tag so that said annotation is shown as a tip when a user rolls a mouse over the sentence text; and
    present a modified web page to said user.

* * * * *